United States Patent
Horvath et al.

(10) Patent No.: US 6,754,745 B1
(45) Date of Patent: Jun. 22, 2004

(54) METHOD AND APPARATUS FOR DISTRIBUTING A CLOCK IN A NETWORK

(75) Inventors: Alexander Horvath, Tujunga, CA (US); Alfred Abkarian, La Crescenta, CA (US); Richard Haydt, Thousand Oaks, CA (US)

(73) Assignee: Accelerated Networks, Moorpark, CA (US)

( * ) Notice: Subject to any disclaimer, the term of this patent is extended or adjusted under 35 U.S.C. 154(b) by 0 days.

(21) Appl. No.: 09/370,077

(22) Filed: Aug. 6, 1999

(51) Int. Cl.[7] .............................................. G06F 13/372
(52) U.S. Cl. ..................... 710/58; 713/400; 713/500; 713/501
(58) Field of Search ............................... 713/400, 500, 713/501; 710/58

(56) References Cited

U.S. PATENT DOCUMENTS

| | | | | |
|---|---|---|---|---|
| 5,619,541 A | * | 4/1997 | Van Brunt et al. .......... 375/360 |
| 5,631,931 A | * | 5/1997 | Takano et al. .............. 375/347 |
| 5,764,965 A | * | 6/1998 | Poimboeuf et al. ......... 395/551 |
| 5,793,549 A | * | 8/1998 | Alon et al. .................... 360/51 |
| 5,870,445 A | * | 2/1999 | Farwell ....................... 375/371 |

* cited by examiner

Primary Examiner—Jeffrey Gaffin
Assistant Examiner—Mohammad O. Farood
(74) Attorney, Agent, or Firm—Blakely, Sokoloff, Taylor & Zafman LLP (57) ABSTRACT

A network system is described having multiple network components. The multiple network components include at least one central office (CO) and at least one customer premise equipment (CPE) coupled to the at least one CO. One of either the CO or CPE captures a clock, generates a reference clock, and sends the clock to the remainder of the multiple network components to ensure synchronous operation.

12 Claims, 7 Drawing Sheets

METHOD AND APPARATUS FOR DISTRIBUTING A CLOCK IN A NETWORK

FIELD OF THE INVENTION

The present invention relates to distributing a clock in a network; more particularly, the present invention relates to generating a reference clock and supplying the reference clock throughout the network for synchronizing clocks.

BACKGROUND OF THE INVENTION

Synchronization of today's digital networks is essential to reliable transport of delay sensitive services such as voice and video. Network Synchronization prevents impairments that could result in unreliable and/or unpredictable service performance. These impairments include jitter, wander, and phase transients.

Jitter is a short term variation of the significant instants of a digital signal from their ideal position in time, where short term refers to phase oscillations with spectral components greater or equal to 10 Hertz. jitter can adversely affect the ability of digital equipment to correctly sample an incoming bit stream or lead to overflows or underflows in its buffers. Several factors contribute to jitter generation and accumulation throughout the network. For example, signals passing through repeaters accumulate jitter due to imperfections in timing circuits. Jitter is also generated by multiplexers during bit stuffing/removal process to accommodate frequency differences.

Wander is a long term variation of the significant instants of a digital signal from their ideal position in time, where long term refers to phase oscillations with spectral components less than 10 hertz. Clocks average the characteristics of their reference over a period of time to develop an estimate of the reference. Wander causes inaccuracies in this estimate. Wander is mostly generated by and/or contributed to the asynchronous nature of mapping lower speed DSx signals into higher speed SONET frames that require occasional payload pointer adjustments. Wander is also caused by effects of temperature variations on transmission media.

Phase transients is a large and sudden change in phase of a signal. Phase transients are caused by hardware protection switching of primary and secondary clock sources or by payload pointer adjustments in SONET.

Jitter, wander, and phase transients cause frame slips. Repetition or deletion of a complete frame is called a "controlled slip". An "uncontrolled slip" is a disruption in a framing pattern that causes frame alignments. Several studies have been conducted to measure the effects of these impairments on applications.

A purpose of clock synchronization is to prevent slips in a digital network. Slips are a disruption in the data flow due to an overflow or underflow of a buffer due to variations in read and write rates.

In a standard system, the data is written into a buffer at the same rate as it is read. Since the read and write rates are dependent on two separate clocks, if the clocks are not synchronized, the read and write rates differ and slips occur. For example, if the read clock is 1.544000 MHz, the write clock is 1.544001 MHz and the buffer is 1 frame (193 bits), then a slip, in this case an over run, occurs after 193 seconds. The larger the buffer is, the longer it takes for a slip to occur, but it will eventually happen.

Figure 1:
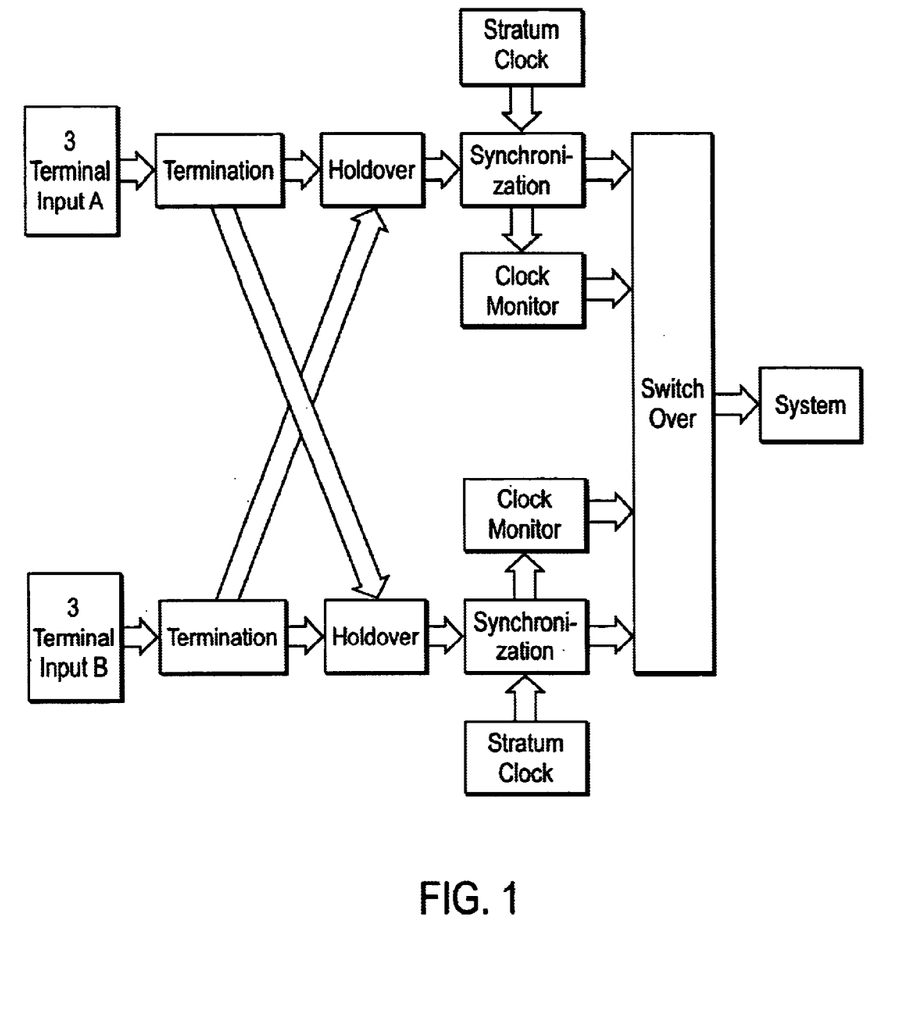
FIG. 1 illustrates a BITS clocking system for GR-1244.

There are basically two modes of clocking defined as BITS and Line. FIG. 1 illustrates a BITS clocking system for GR-1244. See Clocks for Synchronized Network: Communication Generic Criteria, GR-1244-Core, issue 1, January 1995; GR-1244-ICR, issue 1A, December 1996; Synchronous Optical Network (SONE-T) Transport Systems: Communication Generic Criteria, GR-253-CORE, issue 2, December 1995 and Rev. 2, January 1999; GR-253-ICR, issue 2C, Feb. 1, 1999. Referring to FIG. 1, the basic clock system for GR-1244 consists of two redundant inputs, which are 3 wire wrap terminals, that are properly terminated and then fed to redundant clock circuits. Each of the redundant paths includes holdover circuitry that has access to the other path. Each holdover circuitry provides a clock to synchronization circuitry. A Stratum clock from a Stratum clock source (e.g., a local oscillator) is also sent to the synchronization circuitry and is used in the absence of a clock at the input of the clock system. The clock monitor includes circuits that monitor the quality of the clock, causes the synchronization circuitry to synchronize the input clock to the system clock requirement, and provides control for switchover circuitry in case of failure of either input or clock circuitry. The output of the switch over is provided to the system.

Figure 2:
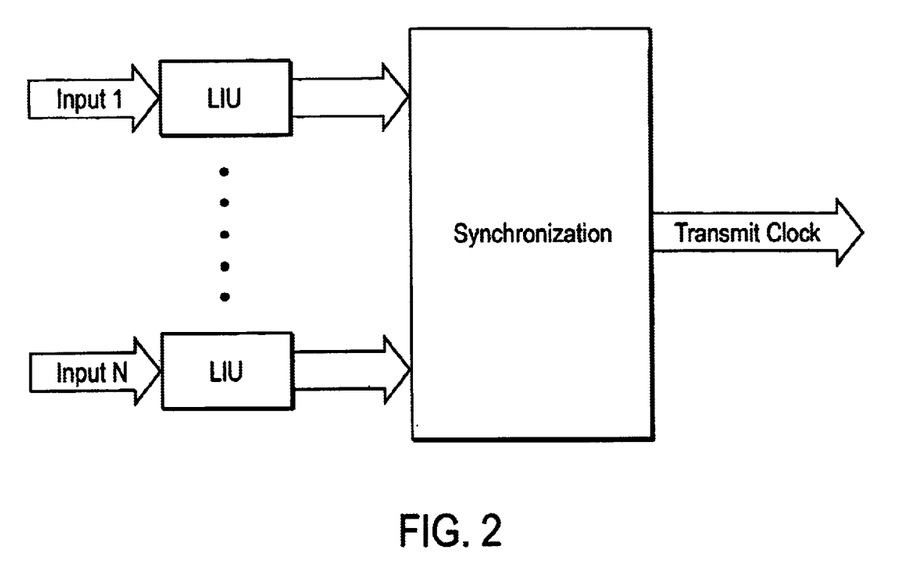
FIG. 2 illustrates an ideal line clock system.

FIG. 2 illustrates an ideal line clock system. Referring to FIG. 2, the line clock system for GR-1244 consists of two active inputs providing clocking for all outputs through a line interface unit (LIU), where any port on the system can be used as primary and any other as secondary clock source. These clocks are then used for the transmit clock on all interfaces.

Clocks are distributed through various systems using a hierarchical system. Clocks distributed in this way are commonly referred to as Stratum clocks. In a Stratum Hierarchy, there are four defined levels of hierarchy called PRS or Level 1 through Level 4 where Level 1 is the most precise and Level 4 is the least precise. Table 1 below illustrates the Stratum Hierarchy.

TABLE 1

Stratum Hierarchy

| Level | PPM Rating | Holdover | Filtering |
|---|---|---|---|
| 1 | 0.000001 | | |
| 2 | 0.0016 | Yes | .01 hz |
| 3e | 4.6 | Yes .001 ppm | .01 Hz |
| 3 | 4.6 | Yes .37 ppm | No |
| SMC | 20 | No | .1 Hz |
| 4e | 32 | No | No |
| 4 | 32 | No | No |

Figure 3:
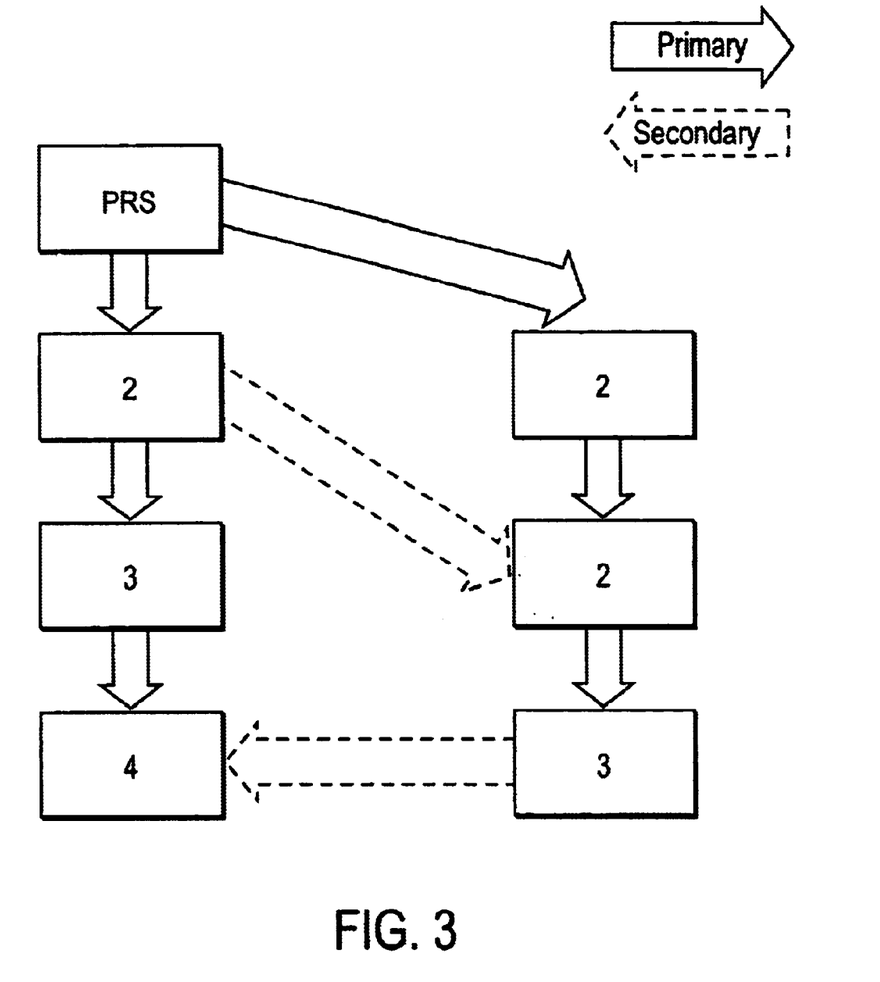
FIG. 3 illustrates an example of the Stratum hierarchy.

In the Stratum hierarchy, Level 1, also known as Primary Reference Clock (PRS), is the most precise and accurate clock available. These clocks are atomic oscillator or GPS based and are used to generate all other clocks used in the network. Each lower level of the hierarchy is supplied by a higher or same level clock source. FIG. 3 illustrates an example of the Stratum hierarchy.

Figure 4:
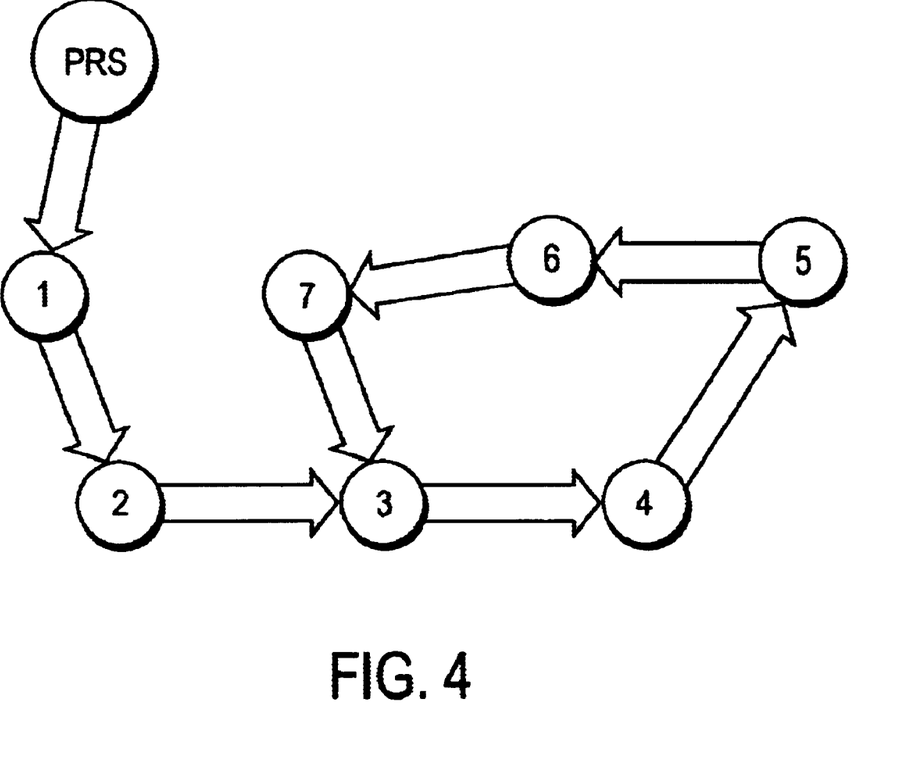
FIG. 4 illustrates a loop condition.

In actual implementation, it is necessary to avoid clock loops where multiple units at the same stratum level are connected in a loop. This condition generally occurs when a primary reference to a node fails and the secondary reference is not connected back to a PRS source. FIG. 4 illustrates a loop condition. Referring to FIG. 4, node 3 uses node 2 as the primary source and node 7 as the secondary. While node 2 is operational, nodes 3–7 are using the PRS clock from node 1. However, when node 2 fails, node 3 switches to using node 7 as the backup clock source and a timing loop is created.

In most implementations of a network, a PRS source is used to clock a master Timing Signal Generator (TSG) which then uses DS1s to drive slave TSGs. All network elements in a Central Office are then tied to the master TSG in various ways, thus providing a PRS traceable clock to all interfaces.

In order to obtain a common clock to be used among many network elements, some form of clock recovery is necessary. One of multiple forms of clocking may be used and includes Synchronous Residual Time Stamp (SRTS) clock recovery, adaptive clocking and adaptive data.

The SRTS clock recovery requires that a network clock be provided to customer premises equipment (CPE) in a network, such as an access network. The SRTS method uses a Residual Time Stamp (RTS) to measure and convey information about the frequency difference between a common reference clock derived from the network and a service clock. The same derived network clock is assumed to be available at both the transmitter and the receiver. One problem associated with employing the SRTS method is that the CPE must be redesigned to accommodate it.

Adaptive clocking requires the transmit clock be adjustable based on thresholds in a FIFO. The adaptive clock method is a general method for source clock frequency recovery in a network in which no explicit timing information of the source clock is transported by the network. The method is based on the fact that the amount of transmitted data is an indication of the source frequency, and this information can be used at the receiver to recover the source clock frequency. By averaging the amount of received data over a period of time, CDV (Cell Delay Variation) effects are counteracted. The period of time used for averaging depends on the CDV characteristics. One possible method to measure the amount of data is to use the fill level of a user data buffer. For example, in one such case, the receiver writes the received data into a buffer and then reads it out using a locally generated clock. Therefore, the fill level of the buffer depends on the source frequency and it is used to control the frequency of the local clock. Thus, in such a case, the fill level of the buffer is continuously measured and the measure is used to drive a phase-locked loop generating the local clock. The method maintains the fill level of the buffer around its medium position. To avoid buffer underflow or overflow, the fill level is maintained between two limits. When the level in the buffer reaches the lower limit, this means the frequency of the local clock is too high to the one of the source and so it has to be decreased; when the level in the buffer reaches the upper limit, the frequency of the local clock is too low compared to the one of the source and so it has to be increased.

The adaptive data method uses buffering of the data stream to allow for reduction in data overruns. Periodically frames are dropped from the buffered stream when an overrun is detected. This method reduces the data rates available on the TDM stream since frames are periodically lost. An obvious problem of this method is that it does not support a full bandwidth connection.

SUMMARY OF THE INVENTION

A network system is described. In one embodiment, the network system comprises multiple network components. The multiple network components include at least one central office (CO) and at least one customer premise equipment (CPE) coupled to the at least one CO. One of either the CO or CPE captures a clock, generates a reference clock, and sends the clock to the remainder of the multiple network components to ensure synchronous operation.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for synchronizing clocks in a network is described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A network system is described having one or more central offices (COs) coupled to one or more customer premise equipment (CPEs). One of the COs captures a clock off the network and uses the clock to generate line rates. To ensure that all the components in the network operate with synchronized clocks, the CO sends a reference clock signal to the remainder of the network. In one embodiment, the reference clock is at a frequency that is the lowest common denominator of the other transmit clocks in the system. Using the reference clock, the individual components in the network generate one or more transmit clocks, which are synchronized to the reference clock. In one embodiment, all the interfaces of the components are synchronized. Thus, all clocks in the system are synchronized using the reference clock so that both the source and destination of a data transfer run at the same frequency.

In one embodiment, the reference clock is obtained from a line rate. In systems employing digital subscriber lines (DSL), variable line rates may be used based on the different line lengths. A CO (or CPE) may recover the clock (and its rate) from the data it receives. For instance, the CO may capture the clock from a phone line and use this clock to create the line rate for DSL. In one embodiment, the recovered clock is referenced to a primary referenced source (PRS). Using the recovered clock, the clock may be divided down using a divider to obtain a reference clock having a frequency that is a multiple of all the clocks in the system. In one embodiment, the reference clock has a frequency of 8 KHz.

The reference clock is sent to the other components in the network to generate their transmit clocks. In one embodiment, these other components use clock multiplier, such as, for example, a phase-lock loop (PLL) to multiply the reference clock to a transmit frequency. In one embodiment, the PLL may be programmable. In some instances, the multiplied clock signal may need to be subsequently divided down to the correct frequency.

The reference clock may also be used to obtain the sampling frequency for voice data. In this manner, a CPE using the reference clock in this manner may have its analog-to-digital and digital-to-analog converters locked to a CO.

System Overview

Figure 5:
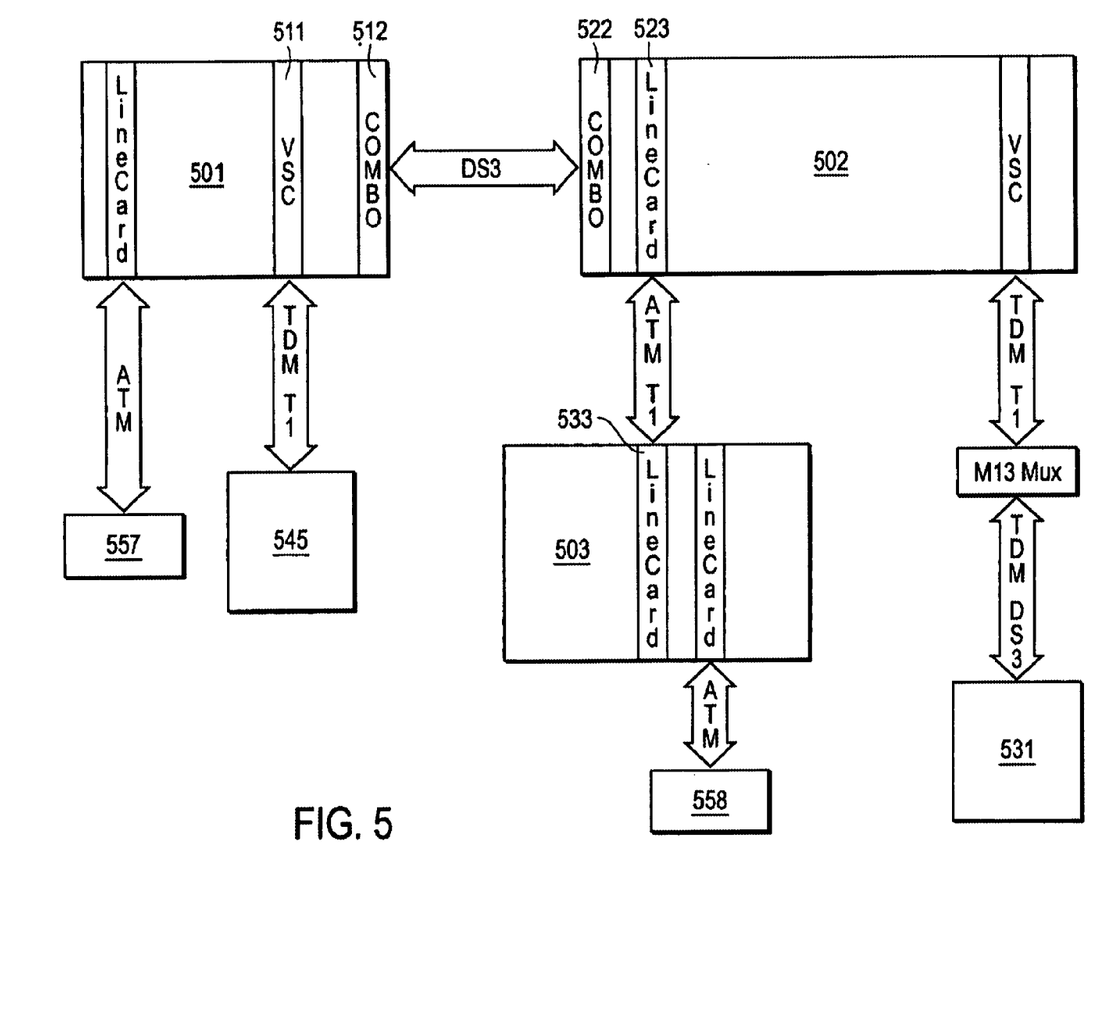
FIG. 5 is a block diagram of a network system.

FIG. 5 is a block diagram of a network system. Referring to FIG. 5, multiple CO chassis 501–503 are shown coupled together. CO chassis 501 is coupled to CO chassis 502 via DS3 lines that interface to combination cards in each CO chassis. CO chassis 503 is coupled to CO chassis 502 via ATM lines that interface to line cards in each CO chassis.

A Class 5 switch 531 is coupled to CO chassis 502 via TDM-based DS3 lines 532, a DS3 to TDM multiplexer 533, and multiple (e.g., 28) T1 lines 534 to enable bi-directional communication. A remote extension of the class 5 switch 545 is coupled to CO chassis 501 via multiple (e.g., 28) T1 lines 546.

One or more CPEs 557 interface to CO chasis 501 via ATM lines that interface to a line card in CO chassis 501. One or more CPEs 558 interface to CO chasis 503 via ATM lines that interface to a line card in CO chassis 503.

In one embodiment, one of CO chassis 501–503 generates a reference clock from a clock source (e.g., a clock input, a data transfer, etc.) using, for example, clock recovery. The CO chassis distributes the reference clock to other network components, which use the reference clock to generate transmit clocks synchronized with the clock source used to generate the reference clock. For example, CO chassis 501 may receive data from the remote extension of the Class 5 switch 545 through one or more T1 lines. The voice server card 511 in CO chassis 501 receives the data and generates an 8 KHz reference clock which is passed to the backplane (not shown) of CO chassis 501 to combination card 512. The combination card 512 forwards the clock using DS3 to the combination card 522 of CO chassis 502. The combination card 522 would then transmit the reference clock onto the backplane (not shown) of CO chassis 502 to line card 523. Line card 523 forwards the clock to line card 533 in CO chassis 503 via ATM lines. Line card 533 forwards the transmit clock onto the backplane of CO chassis 503. Once this occurs, all of the transmission of data throughout the network is synchronized to the same clock. That is, the interfaces to the cards are synchronized to the same clock. The system administrator may decide which source is to act as the source from which the reference clock may be generated.

All subscribers 531 will be also in sync since either voice server card 521 or 522 that distribute the clock through the system.

In an alternative embodiment, a timing source generator (TSG) at each site, connected to a voice server may ensure that all the voice servers and line cards are using the same clock. As a secondary option, the voice server card can use the clock from its line 1 to sync the systems as long as the source of the clock for line 1 is connected to a BITS source (PRS traceable).

In one embodiment, a T1 from CO chassis 501 can be sent to the reference clock input in the voice server cards in both CO chassis 502 and 503, allowing each of their voice server cards to synchronize the remainder of the CO chassis. However, it is advantageous if this T1 is PRS traceable and not VT grouped within SONET frame (as discussed in the Bellcore specifications GR-1244 and GR-253).

An Exemplary Central Office Embodiment

Figure 6:
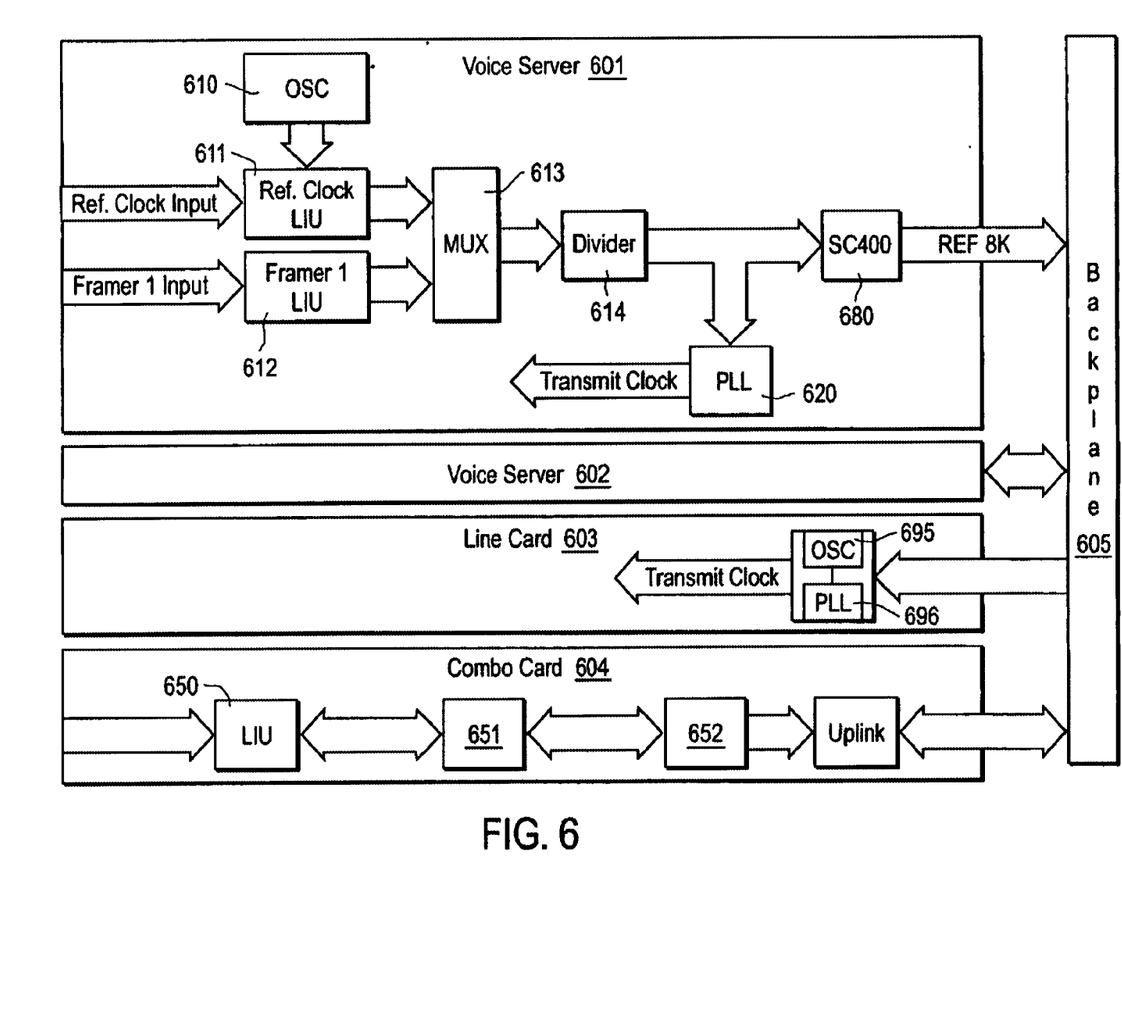
FIG. 6 illustrates an exemplary CO chassis having a voice server card to generate a reference clock, by which transmit clocks can be generated and/or transmitted on all ports to be synchronized.

FIG. 6 illustrates an exemplary CO chassis having a voice server card to generate a reference clock, by which transmit clocks can be generated and/or transmitted on all ports to be synchronized. The CO chassis transmits a clock that is the lowest common denominator for all transmit and receive clocks. In one embodiment, the CO chassis transmits an 8 KHz clock on the back plane that is for synchronizing all the ports. This synchronization is performed on each card of any CPEs and COs coupled to the CO chassis.

Referring to FIG. 6, four line cards 601–604 are coupled to a backplane 605. Line cards 601 and 602 comprise voice server cards, while 603 comprises a linecard, and 604 comprises a combination (combo) card. Although only four line cards are shown, the CO may include more or less cards depending on the application.

In one embodiment, the voice server card 601 recovers the clock from a port and supplies the clock to the rest of the system via backplane 605. Each down link port, i.e. line card uses the supplied 8K clock to synchronize its transmit clocks. The clock information is sent to each CPE. The transmit clock may also be generated from local sources.

In one embodiment, voice server card 601 provides the 8 KHz on the backplane from one of three sources: a local oscillator 610, a reference clock line interface unit (LIU) 611 or from a framer 1 LIU 612. The reference clock LIU 11 is coupled to receive a reference clock on its input. In one embodiment, the reference clock is from a PRS, such as a 5ESS switch. In one embodiment, in each case, the input clock is 1.544 MHz and is divided down to 8 KHz.

The outputs of reference clock LIU A11 and Framer 1 LIU 612 are coupled to inputs of a clock switcher 613 that selects between two inputs. In one embodiment, clock switcher 613 comprises a multiplexer. In one embodiment, clock switcher comprises software that switches between the Ref Clock LIU 611, Framer 1 LIU 612 and the backplane when another card is providing an 8 KHz clock signal to voice server card 601 (not shown).

The reference clock is input to a line interface unit where it is probably terminated and the clock is recovered. In one embodiment, the oscillator runs at 12.352 MHz and the reference clock LIU 611 uses it at 1.544 MHz. The Framer 1 port may receive a clock or clock and data. In the case of the latter, the Framer 1 LIU 612 separates the clock and the data, forwarding the clock to the clock switcher. The clock switcher selects between the two clocks. The divider divides the clock down to a clock which is the least common denominator of all the clocks which are to be synchronized in the system. In one embodiment, the divider divides the clock down to 8 KHz. The backplane driver chip 680 drives the reference clock onto backplane 605.

Voice server 602 includes a phase-locked loop (PLL) that uses the 8 KHz clock and generates a transmit clock for its line interfaces. A telecommunications PLL may be used for ease of programming for a telecommunications application.

Voice server card 602 receives the 8 KHz reference clock and provides the transmit clock on all the ports to be synchronized with an 8 KHz clock from the backplane in the same way voice server card 601 uses PLL 620 to generate a transmit clock. Note that all cards being synchronized have a PLL or other clock multiplying device to generate the transmit clock from the reference clock being received from another source (e.g., the voice server card 601).

Line card 603 is coupled to receive the 8 KHz reference clock from backplane 605 and provides for the transmit clock on all the ports to be synchronized with an 8 KHz clock from backplane 505. CO chassis 503 generates the transmit clock using a PLL 696. In such a case, the line card 603 does not source the 8 KHz clock (i.e., the line card does not drive the 8 KHz on backplane 605).

On line card 603, a local oscillator 695 is used for the transmit clock. Each line provides the clock to the receiver at the other end. If the other end uses the receive clock for transmit, there is no data lost on the link, however each link is asynchronous with the rest of the system. This situation causes data overrun or underrun on the end to end link between CPEs. Although each link in the system will not lose data, data is still lost between links in the network because each link is running at a slightly different rate.

If the other end of the link is also supplying clock, then there will be data lost on the link since the transmit and receive will be running at slightly different rates.

Linecard 603 may recover the clock from the line on each port and use the clock for the transmit clock. Each line runs in synch with the receive clock and asynchronous with the rest of the system. This situation will cause data overrun or underrun on the end to end link between CPEs. Although each link in the system will not loose data, data is still lost between links in the switch matrix because each link is running at a slightly different rate.

Combination card 604 provides synchronization of its uplink to the 8 KHz reference clock received from the backplane. In one embodiment, combination card 604 generates the 8 KHz reference clock onto backplane 605 using uplink block 690 in conjunction with a DS3 framer 651 and a LIU 650. Specifically, a reference input clock is received by LIU 650. The output of the DS3 framer 651 is coupled to a jitter attenuator 652. Jitter attenuator 652 reduces, and may even remove, the jitter in the clock signal. The output of the jitter attenuator 652 is coupled to DS3 uplink block 653 which passes the 8 KHz reference clock to backplane 605.

Note that because the interfaces to the cards includes the clock synchronization and reference clock generating circuitry, the reference input clock may be received from a variety of different sources. In one embodiment, the interface selected to generate the reference clock uses a reference clock input that may be traced back to a primary reference source (PRS) or other stable clock.

In an alternative embodiment, the clock synchronization is performed on a clock synchronization card, instead of a voice server. The clock card may comprise a voice server with all daughter boards removed, yet having the same limitations and functions as voice server card 601

In one embodiment, such a clock recovery card may include a BITS clock input or a GPS input. The GPS input would enable maintaining a local oscillator in near Stratum 1 operation. Note that the GPS receiver has access to the GPS satellites via an antenna.

Customer Premises Equipment

In one embodiment, each CPE provides both data and voice network access. To support data and voice network access, each CPE includes a number of cards.

In one embodiment, each card in a CPE has two modes of operation: master and slave. The mode of operation is determined by a logic level on a pin of the card. In one embodiment, a logic level of 1 puts the card in master mode, while a logic level of 0 puts the card in slave mode. In master mode, the card expects the reference clock (e.g., 8 KHz) input from a stable clock source. The card includes an on-board clock multiplier, such as a PLL, to multiply the frequency of the reference clock up to a predetermined amount. Such a multiplied clock may be used for synchronization. In one embodiment, an 8 KHz reference clock is multiplied up to a 2.048 MHz reference clock and is used in a framer on the card for synchronization. In the slave mode, the line card is synchronized to the line rate and the line card recovers the reference clock signal (e.g., 8 KHz). For example, a framer or transceiver on the line card may be synchronized to the line rate to recover the reference clock signal.

In one embodiment, the PLL is programmable. In such a case, the PLL may be limited to multiplying the reference clock frequency to a predetermined maximum clock frequency (e.g., 12.352 MHz).

In one embodiment, in order to recover a line rate from an uplink at different uplink speeds, a clock synthesizer is programmed according to the line rate. The clock synthesizer recovers the clock signal and may be programmed to divide the clock down to the reference clock signal using a prescaler division factor. In one embodiment, the prescaler division factor is programmed according to a value stored in a configuration register.

Figure 7:
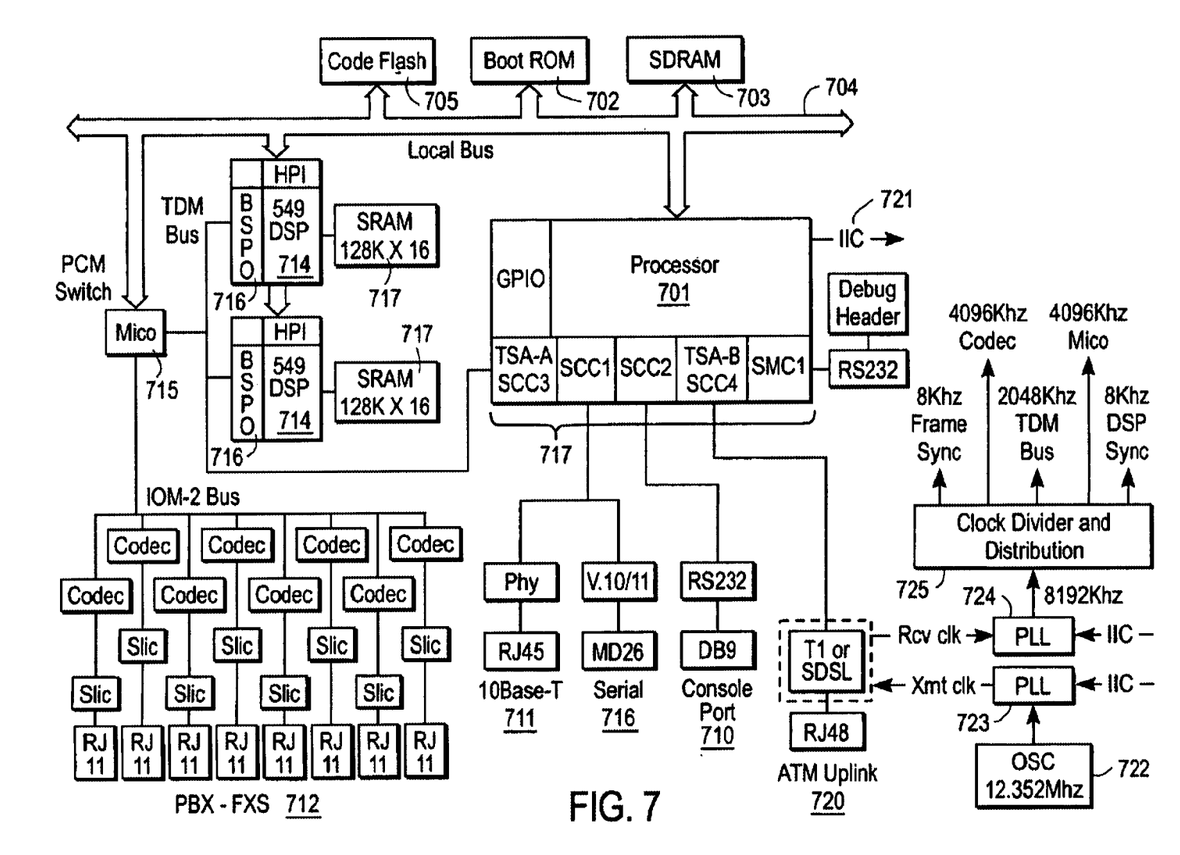
FIG. 7 illustrates a block diagram of one embodiment of a CPE.

A block diagram of one embodiment of a CPE is shown in FIG. 7. Referring to FIG. 7, the CPE comprises a central processor 701, a boot read-only memory (ROM) 702, a synchronous dynamic random access memory (SDRAM) 703 and a code flash memory 705 coupled together via a local bus 704.

The CPE also includes a console port 710 to provide an asynchronous PC compatible communication port. In one embodiment, the console port uses a RS232 port connected to the computer with a null modem cable and having a connector.

The CPE also includes a 10Base-T port 711 that uses an RJ45 phone jack. The CPE has a serial port 716 which interfaces to the rest of the CPE using an MD26 connector and V.10/11.

The CPE may include a PBX-FXS 712. In one embodiment, the PBX 712 has up to eight RJ11 jacks for direct connection of standard telephony devices such as phones, modems and fax machines. For each of the jacks, there is an integrated SLIC attached directly to the line and a single channel codec/filter.

The codecs/filters interface to the processor 701 using a microcontroller 713. In one embodiment, the microcontroller 713 is a IOM-2 controller that provides the data switching functions to move PCM data from the codecs to DSPs 714 and vice versa.

The DSPs 714 provide echo cancellation and voice compression. The DSPs 714 have a PLL. In one embodiment, the PLL of DSPs 714 receive a 12.5 Mhz clock that has been divided down from the processors 50 Mhz system clock. A static RAM (SRAM) 717 is associated with each of the DSPs 714.

The CPE includes a buffered serial port 716 for each of DSPs 715. The buffered serial ports 716 are coupled to the microcontroller 713. In one embodiment, this enables PCM data from the line interface to be routed to the DSPs 714 for processing.

The CPE includes TDM slot assignments (TSA) 717. The time slots are assigned in the microcontroller 715.

The CPE also includes frequency synthesizer and clock recover chips that are controlled by the processor 701 over an IIC bus 721. In one embodiment, a line locked clock from the clock synthesizer drives the TDM interface and recover an 8 KHz clock for the voice circuitry. The clocks for the interface may be provided externally.

The CPE includes a SDSL uplink 720 that has a PLL 713 associated with it to create the reference transmit clock for the SDSL interface. In one embodiment, the PLL 723 uses a 12.352 Mhz oscillator as a reference and nearly any line rate that is a multiple of 8 Khz is possible. A second PLL 724 is used to create an 8 MHz clock from the SDSL interface receive clock. The setting for PLL 724 is dependant on the setting of the SDSL transmit clock PLL 723. The 8 MHz clock is used to make the 4 MHz clock required by the SLIC and CODEC chip set and the 2 MHz required for the serial interface between the processor 701, microcontroller 713, and the DSPs 715 using clock divider and distribution block 725.

In one embodiment, the transmit clock (Xmt clk) to a DSL interface is only used until synchronization with the Central Office is established after which the DSL interface uses the recovered receive clock as its transmit clock. In one embodiment, with the PLL 724 being programmable, the receive clock (Rcv clk) is divided down and then back up to create the 8 Khz clock required to the rest of the circuitry. In one embodiment, the transmit clock and the receive clock are 8 times the actual line rate so when Xmt clk is set to 12.252 Mhz the line rate will be 1544 Khz.

In one embodiment, any line rate that is a multiple of 8 Khz can be created for the DSL transmit clock reference and the receive clock PLL 724 can convert it back to 8192 Khz (8 Khz).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network system comprising a plurality of network components including:
    at least one customer premise equipment (CPE) located on premises of a customer; and
    at least one central office (CO) communicatively coupled to the at least one CPE over a network, the at least one CO defining a locality to which customer lines from the at least one CPE are connected on a local loop, the CO to perform a switching function to switch calls from the at least one CPE to local subscribers or to equipment of long-distance carriers,
    wherein one of the CO or the CPE captures a clock, generates a reference clock, and sends the reference clock, together with voice and data over the customer lines to the at least one CO or the at least one CPE to ensure synchronous operation of the network system.

2. The system defined in claim 1, wherein the customer lines comprise DSL lines.

3. The system defined in claim 1 wherein the reference clock is at a frequency that is the lowest common denominator of other transmit clocks in the system.

4. The system defined in claim 1 wherein the one CO or CPE recovers a clock from a line rate and generates the reference clock from the recovered clock.

5. The system defined in claim 4 wherein the recovered clock is referenced to a primary referenced source (PRS).

6. The system defined in claim 4 wherein the recovered clock is divided down using a divider to obtain the reference clock.

7. The system defined in claim 1 wherein the reference clock has a frequency of 8 KHz.

8. A network system comprising a plurality of network components including:
    at least one customer premise equipment (CPE); and
    at least one central office (CO) defining a locality to which customer lines to the at least one (CPE) are connected on a local loop, the CO to perform a switching function to switch calls from the at least one CPE to local subscribers or to equipment of long-distance carriers,
    wherein one of the CO or CPE recovers a clock from a line rate, generates a reference clock from the recovered clock, the reference clock having a frequency that is the lowest common denominator of other transmit clocks in the system, and sends the reference clock to the at least one CO or the at least one CPE together with voice and data over the customer lines to ensure synchronous operation of the network system.

9. The system defined in claim 8, wherein the customer lines comprise DSL lines.

10. The system defined in claim 8 wherein the recovered clock is referenced to a primary referenced source (PRS).

11. The system defined in claim 8 wherein the recovered clock is divided down using a divider to obtain the reference clock.

12. The system defined in claim 8 wherein the reference clock has a frequency of 8 KHz.

* * * * *